Jan. 24, 1939.    C. H. BURNS    2,144,831
FRICTION CLUTCH FACING
Filed Jan. 14, 1935
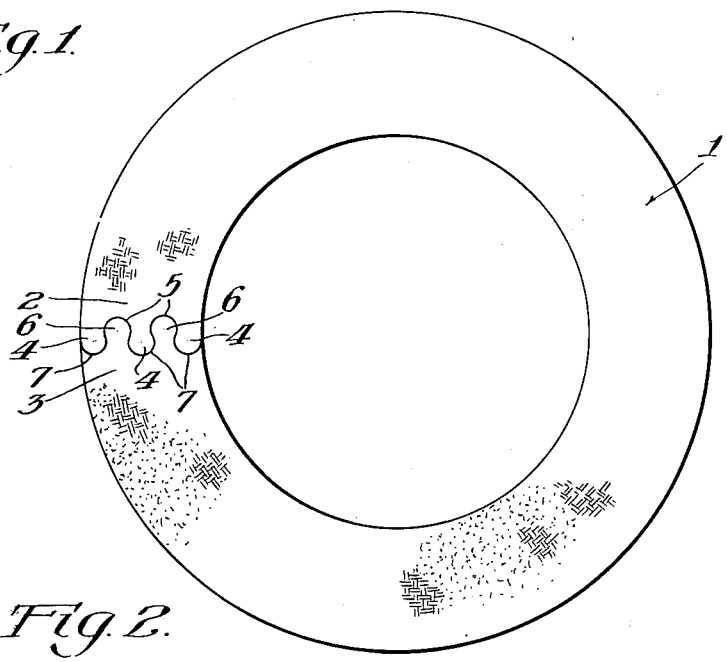
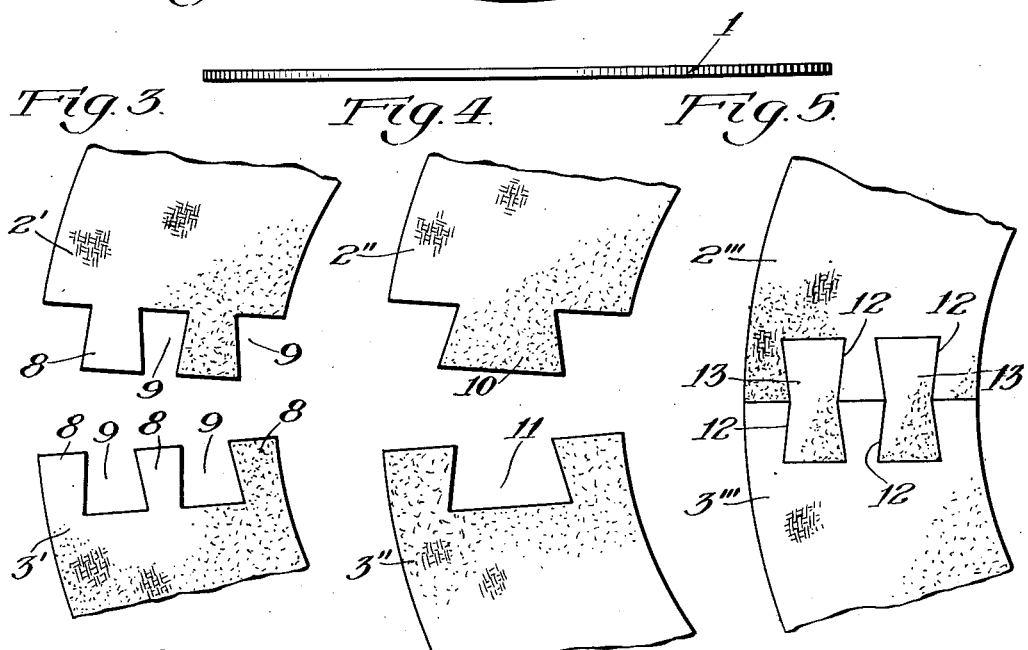
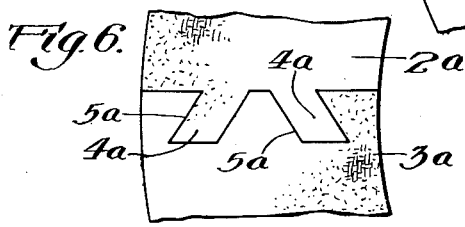
Inventor:
Charles H. Burns,
By Lee J. Gary
Attorney Patented Jan. 24, 1939

2,144,831

UNITED STATES PATENT OFFICE 2,144,831

FRICTION CLUTCH FACING

Charles H. Burns, Lancaster, Pa., assignor to Raybestos-Manhattan, Inc., Passaic, N. J., a corporation of New Jersey Application January 14, 1935, Serial No. 1,693

6 Claims. (Cl. 192—107)

This invention relates to improvements in the manufacture of friction clutch facings of the woven or braided type and refers specifically to the manufature of an endless, annular clutch facing from a strip comprising woven or braided asbestos strands saturated or impregnated with a bonding medium, wherein an interlocked joint unites the ends of the strip to form an integral, unitary ring.

It has heretofore been proposed, in the construction of annular clutch facings from strips of woven or braided friction material, to join the meeting ends by metal rivets or staples. A clutch ring of this construction presents some disadvantages for certain uses in that the metal rivets or staples sometimes tend to cause scoring of the metal pressure plates or fly-wheel, and in addition, wear in service of the top of the staple causes the same to sever, resulting in rupture of the joint and separation of the ends of the ring.

Briefly described, my invention comprises the manufacture of an endless clutch ring from a strip or strips of suitably woven or braided friction material, the ends of which strip are adapted to be joined to form a continuous ring, the juncture of said ends comprising interlocking elements formed either separately or as an integral portion of the joining ends. As a feature of my invention, a continuous clutch ring is provided having a substantially homogeneous structure since the end interlocking means preferably comprises material having the same or similar characteristics to the remaining portions of the ring. Moreover, the faces of the ring comprise single planes, no projecting, joining elements or overlapping edges being necessary. As a result, a more uniform ring is provided which will not score the pressure plates of the clutch and will have no tendency to rupture or separate at the joint.

For certain uses, annular clutch rings of braided or woven construction are preferred to annular rings constructed by stamping them from non-woven or non-braided masses of fibers and a bonding agent such as felted millboard, extruded or molded masses and the like. The clutch ring of this invention is especially adapted for those certain uses in which woven or braided clutch rings are preferred, and it is not open to the objection that the staples or rivets uniting the ends may cause scoring of the pressure plates or may rupture or separate at the joint.

Other advantages of my invention will be apparent from the accompanying drawing and following detailed description.

In the drawing, Fig. 1 is a face view of an annular clutch ring having a joint embodying the concept of my invention. This figure illustrates the joint prior to the curing which produces a substantially homogeneous structure throughout the ring, including the joint, the latter substantially losing its identity by merging in the homogeneous structure and being substantially unnoticeable to casual observation.

Fig. 2 is an edge view of the structure illustrated in Fig. 1 to show its relative thickness.

Fig. 3 is a fragmentary detail view of a slightly modified form of joint, illustrating the ends just prior to being interlocked.

Fig. 4 is a view similar to that shown in Fig. 3, illustrating another modified form of joint.

Fig. 5 is a similar view showing a further modification.

Fig. 6 is a similar view illustrating another modification of my invention.

Referring in detail to the drawing, I indicates an annular clutch ring which may be utilized as a friction member in an automobile clutch. The ring I may be constructed of one or more woven or braided strips of asbestos strands, or asbestos-covered wire strands, previously treated with any of the well known frictioning agents such as rubber, drying oils, resins, asphaltic oils and the like. The strips comprising the ring I may be initially formed as woven or braided rectangular strips. A single strip may be woven or braided to the thickness desired or may be folded longitudinally one or more times to provide a multi-ply structure or, if more than one strip is used, the same may be plied together to form a multi-ply structure. The rectangular multi-ply structure thus formed may then be rolled, for instance, by conical coacting rolls to form said structure into a circular or annular disc having two opposed meeting ends, as shown at 2 and 3, 2' and 3', 2'' and 3'', and 2''' and 3''' in Figs. 1, 3, 4 and 5, respectively.

Of course, in order to form a continuous ring, with reference to Fig. 1, ends 2 and 3 must be joined, and as a feature of my invention, I provide an interlocking means of engagement between said ends. The interlocking instrumentalities may comprise radially spaced projecting tongues 4 formed on the end 2 interspersed with grooves or recesses 5. Similarly, end 3 may carry projections 6 which register with recesses 5 interspersed with recesses 7. The ends 2 and 3 are preferably punched or stamped to form the projecting tongues and recesses described but may be formed in any other suitable manner. The projections 4 and 6 are brought into register with recesses 7 and 5, respectively, said projections and recesses being reciprocal in contour.

The facing 1 may then be placed in a mold wherein it is pressed under hydraulic pressure and cured. The heat and pressure causes the bonding material to flow and also a flowing effect is imparted to the fabric or tape wherein the projections and recesses are thoroughly bonded and amalgamated into a substantially homogeneous structure. Thereafter, the facing may be subjected to additional curing under relatively high temperatures and is subsequently ground to desired thickness and finished ready for use.

Because the rings are made of woven or braided fabric it will be apparent that when the ends thereof are punched or stamped to form interlocking projections and recesses said ends will be more or less ragged containing a plurality of irregularly projecting fibers. It will also be apparent that when heat and pressure are applied the bonding material will be caused to flow across the joint so that the binder is homogeneous throughout the ring. Due to the application of heat and pressure the irregularly projecting fibers of the registered ends of said ring tend to flow across the joint and become intermeshed and interlaced, and due to the flow of the binder as above pointed out said ends of the ring become coalescently united to form a substantially homogeneous unitary ring wherein said joint substantially loses its identity. In view of the foregoing it will now be apparent that the words "substantially homogeneous" as used herein and in the claims is intended to define a construction which very closely approximates homogeneity.

Referring particularly to Fig. 3, a slight modification of my invention is shown wherein the abutting ends 2' and 3' of a ring similar to ring 1 are provided with dove-tail or keystone projections 8 which are adapted to register and interlock with similar shaped recesses 9. Fig. 4 illustrates another modification wherein ends 2" and 3" are provided respectively with a single dove-tail or keystone projection 10 and single dove-tail or keystone shaped recess 11.

Of course, it is to be understood that the remaining features of the rings partially illustrated in Figs. 3 and 4 are similar to ring 1 and the ring may be constructed and treated otherwise in a manner similar to that described in conjunction with ring 1.

Referring particularly to Fig. 5, a further modification of my invention is shown wherein 2''' and 3''' indicate the opposed ends of a ring similar to ring 1. In this construction both ends 2''' and 3''' are provided with dove-tail recesses 12, which, when the ends are brought to abutting position are disposed opposite each other. Prior to pressing and curing in a mold, as has been hereinbefore described, inserts 13 registering in shape with recesses 12 are disposed in said recesses. Inserts 13 are preferably constructed of a material similar to that comprising the ring but the same, if desired, may be made of a material having different characteristics. The ring is then subjected to pressure and cured, as has been hereinbefore described.

Referring particularly to Fig. 6, a portion of a ring is illustrated similar to ring 1, 2a and 3a indicating the respective meeting ends thereof. End 2a may carry projecting tongues 4a, the axes of which diverge with respect to each other. The end 3a may be provided with recesses 5a within which said projections are adapted to register to unite the ends 2a and 3a and form a continuous substantially homogeneous ring. It is to be understood, of course, that one or more projections 4a are contemplated, said projection or projections having at least one side at an angle other than a right angle to the line of the joint.

It is to be understood, of course, that the tongues or inserts herein described may take any desired shape or contour, and in addition, one or more tongues or inserts may be provided as the locking means for each joint.

It can readily be seen that I have provided a joint which is relatively strong in tension and which is disposed wholly within the plane of the ring. No projecting metal parts are used and the material of the ring at the joint is not "bunched" or hardened due to the insertion of metal staples or the like. Hence, no hard spots are present in the ring which may cause scoring, and there is no possibility of rupture or separation at the joint.

By the expression "key-member" as used in the claims, is meant a non-metallic member formed either integral with or separate from the ends of the ring and adapted to be insertable in a recess or recesses provided in one or both ends of the ring.

I claim as my invention:

1. A friction facing comprising a strip of woven or braided friction material including a binder, said strip being of greater length than width and of greater width than thickness, shaped to form an endless ring of substantially homogeneous structure, the meeting ends of which are joined by a radial joint comprising a non-metallic interlocking key member, said meeting ends being coalescently united by said binder.

2. A friction facing comprising a strip of woven or braided friction material including a binder, said strip being of greater length than width and of greater width than thickness, shaped to form an endless ring of substantially homogeneous structure, the meeting ends of which are joined by a radial joint comprising non-metallic interlocking key members formed integral with said meeting ends, said meeting ends being coalescently united by said binder.

3. A friction facing comprising a strip of woven or braided friction material including a binder, said strip being of greater length than width and of greater width than thickness, shaped to form an endless ring of substantially homogeneous structure, the meeting ends of which are joined by a radial interlocking joint comprising a tongue projecting from one opposed end registering with a recess formed in the other opposed end, said tongue being larger in width at one plane than at another plane intermediate the length of the tongue, said meeting ends being coalescently united by said binder.

4. A friction facing comprising a strip of woven or braided friction material including a binder, said strip being of greater length than width and of greater width than thickness, shaped to form an endless ring of substantially homogeneous structure, the meeting ends of which are joined by a radial butt joint, and interlocking means for said joint comprising an insert, the ends of the ring forming the joint being provided with recesses to receive said insert, said meeting ends being coalescently united by said binder.

5. A friction facing comprising a strip of woven or braided friction material including a binder, said strip being of greater length than width and of greater width than thickness, shaped to form an endless ring of substantially homogeneous structure, the meeting ends of which are joined by a radial butt joint, and interlocking means for said joint comprising an insert, the ends of the ring forming the joint being provided with recesses to receive said insert, said insert being wider at its opposite ends than at its center, said meeting ends being coalescently united by said binder.

6. A friction facing comprising a strip of woven or braided friction material including a binder, said strip being of greater length than width and of greater width than thickness, shaped to form an endless ring of substantially homogeneous structure, the meeting ends of which are joined by a radial joint comprising a non-metallic interlocking key member, said key member having an edge at an angle to the line of the joint other than a right angle, said meeting ends being coalescently united by said binder.

CHARLES H. BURNS.